United States Patent
Kasera et al.

(10) Patent No.: US 7,317,686 B2
(45) Date of Patent: Jan. 8, 2008

(54) FAIR SHARING OF MULTI-ACCESS CHANNELS

(75) Inventors: Sneha Kasera, Eatontown, NJ (US); Ramachandran Ramjee, Edison, NJ (US); Danny Raz, Timrat (IL); Yuval Shavitt, Raanana (IL); Prasun Sinha, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 993 days.

(21) Appl. No.: 10/242,051

(22) Filed: Sep. 12, 2002

(65) Prior Publication Data

US 2004/0052210 A1    Mar. 18, 2004

(51) Int. Cl.
*H04J 1/16* (2006.01)
(52) U.S. Cl. ...................... 370/235; 370/412
(58) Field of Classification Search ............... 370/235, 370/235.1, 236.1, 236.2, 237, 401, 229, 230, 370/232, 234, 352, 412, 415
See application file for complete search history.

(56) References Cited

U.S. PATENT DOCUMENTS

| 5,631,906 A | * | 5/1997 | Liu ............................ 370/455 |
| 5,812,527 A | * | 9/1998 | Kline et al. .................. 370/232 |
| 6,888,794 B1 | * | 5/2005 | Jovanovic et al. ........... 370/230 |

OTHER PUBLICATIONS

Sobrinho, J.L., et al: *Real-Time Traffic over the IEEE 802.11 Medium Access Control Layer*, Bell Labs Technical Journal, vol. 1, No. 2, Autum 1996, pp. 172-187, Appeared also in Globecom'96, Nov. 1996.

Deng, J., et al: *A Priority Schemelfor IEEE 802.11 DCF Access Method*, IEICE Transactions on Communications, vol. E82-B, No. 1, Jan. 1999, pp. 96-102.

Barry, M., et al: *Distributed Control Algorithms for Service Differentation in Wireless Packet Networks*, in INFOCOM'01, Anchorage, AK, USA, Apr. 2001.

Vaidya, N.H., et al: *Distributed Fair Scheduling in a Wireless LAN*, in MobiCom 2000, Boston, MA, USA, Aug. 2000.

Golestani, S.J., *A Self-Clocked Fair Queueing Scheme for Broadband Applications*, in INFOCOM'94, Toronto, Canada, Jun. 1994, pp. 636-646.

Aad, I., et al: *Differentiation mechanisms for IEEE 802.11*, in INFOCOM'01, Anchorage, AK, USA, Apr. 2001.

Lu, S., et al: *Fair Scheduling in Wireless Packet Networks*, in ACM SIGCOMM'97, Cannes, France, Sep. 1997.

(Continued)

*Primary Examiner*—Wellington Chin
*Assistant Examiner*—Alexander O. Boakye

(57) ABSTRACT

A network node computes a fair share data rate for the sharing of a shared communication channel in a local area network. The network node determines the required information for computing the fair share by snooping the network, by receiving the required information from other network nodes, or a combination of the two techniques. Alternatively, instead of computing the fair share data rate, the network node may receive the fair share data rate which was computed by another network node. The fair share data rate is enforced by the network node in a network protocol stack layer above the media access control layer. In one embodiment, the network protocol stack layer above the media access control layer is the link layer.

17 Claims, 3 Drawing Sheets

OTHER PUBLICATIONS

Nandagopal, T., et al: *Achieving MAC Layer Fairness in Wireless Packet Networks*, in ACM Mobicom 2000, Boston, MA, USA, Aug. 2000.

Yavatkar, R., et al: *SBM (subnet bandwidth manager): A protocol for RSVP-based admission control over IEEE 802-style networks*, May 2000, Internet RFC 2814.

Koksal, C.E., et al: *An Analysis of Short-Term Fairness in Wireless Media Access Protocols*, Tech. Rep. MIT-LCS-TR-807, MIT, LCS, May 2000, Also a short presentation of ACM SIGMETRICS 2000.

* cited by examiner

FIG. 5

1. Input: $B, \{b_i, s_i\}_{1 \leq i \leq n}$

2. $S \leftarrow \{i \mid s_i = 1\}$

3. $U \leftarrow \{i \mid s_i = 0\}$

4. $b_f \leftarrow \dfrac{B - \sum_{i \in s} b_i}{|U|}$ 5. if $\forall i \in S : b_i \leq b_f$ 6.     output b 7. else 8.     select j s.t. $\forall i \in S : b_j > b_i$ 9.     $S \leftarrow S - \{j\}$ 10.     $U \leftarrow U + \{j\}$ 11.     goto line 4

FAIR SHARING OF MULTI-ACCESS CHANNELS

TECHNICAL FIELD

The present invention relates generally to data networking. More particularly, the invention relates to sharing a multi-access channel.

BACKGROUND OF THE INVENTION

Many data networks utilize a shared communication channel for communication between nodes of the network. An Ethernet network is one example of a local area network (LAN) in which the nodes connected to the LAN all share a common communication channel. In the case of an Ethernet LAN, the shared communication channel is a physical wire connecting the nodes. A wireless LAN is another example of a LAN in which the nodes within the serving area of a base station all share a common communication channel. In the case of a wireless LAN, the shared communication channel is the air interface.

In shared channel communication networks such as Ethernet and wireless LAN, the communication channel may only be used by one node at a time. As such, all nodes within the network compete for access to the shared channel. The management of access to the channel is accomplished using a media access control (MAC) protocol. In an Ethernet network, the access control is defined by the IEEE 802.3 standard which is well known in the art of data networking. In one type of wireless LAN, the access control is defined by the IEEE 802.11 standard which is also well known in the art of data networking. It is important for an understanding of the present invention to point out that the MAC protocols are implemented within network nodes at a MAC layer, which is a software application layer within the node's network protocol stack. As is well known in the art of data networking and computer science, a network protocol stack defines multiple software layers within a nodes software architecture. These software layers control various data networking operations. For example, the lowest layer is generally the physical layer, which defines the operation at the most basic physical data transport layer. The MAC layer is above the physical layer and implements the MAC protocol. Above the MAC layer are various other layers, including the link layer which maintains a reliable link between two nodes and the application layer which implements a particular application (e.g., email, internet access) being executed by the node.

There are generally two types of nodes connected to a shared communication channel network as illustrated in FIG. 1. FIG. 1 shows a shared communication channel 102 which is shared by nodes 104, 106, 108, 110. Nodes 106, 108, 110 are hosts. Hosts are nodes which share the communication network but are not directly connected to an external data network 120. The hosts generally communicate with the external network 120 via a gateway node 104 which is connected to the shared communication network as well as to one or more external networks. The gateway acts as a conduit for data packets between the hosts and the external network(s). Generally, the host nodes are associated with end users while a gateway is generally a network node used to relay end user data packets to and from external networks.

MAC protocols are generally designed to provide all nodes (including both hosts and gateways) on the network with an equal share of the communication channel. However, as will be herein described, this type of sharing at the MAC layer results in an un-fair share of the communication channel. Since the gateway serves multiple hosts on the LAN concurrently, the gateway's access to the shared channel should increase with the number of hosts it serves. However, since the MAC protocols do not distinguish between the gateway and the hosts, some nodes may get an unfair share of the communication channel. This unfairness is illustrated in conjunction with FIG. 1. Consider the data flows shown in FIG. 1 in which host 106 is receiving data from the external network via data flow 112, host 108 is receiving data from the external network via data flow 114, and host 110 is sending data to the external network via data flow 116. Each of the data flows 112, 114, 116 are being relayed to/from the external network 120 via gateway 104. Ideally, a fair sharing of the shared communication channel 102 would result in each of hosts 106, 108 and 110, and associated respective flows 112, 114, 116 obtaining an equal ⅓ share of the communication channel. However, in the scenario being described, only gateway 104 and host 110 compete to transmit data via the communication channel. Hosts 106 and 108 are not competing for the communication channel because they are only receiving data. Thus, since under the MAC protocols there is no distinction between gateways and hosts, gateway 104 and host 110 compete and each get a ½ share of the communication channel. As is readily apparent, this results in host 106 and 108 each receiving ¼ of the communication channel capacity, while host 110 receives ½ of the communication channel capacity.

In a typical LAN, there are more receiving hosts than sending hosts. As would be apparent from the description above, this results in an even higher share for the few senders and a lower share for the many receivers. The unfairness problem described above may be generalized as follows. First, we identify a data flow as an ordered pair of nodes (either host or gateway) sharing the shared communication channel. Next, we assume that s hosts are sending data and that the gateway is transmitting unicast data to r different host receivers. The fair share of each data flow would be $$\frac{1}{s+r}.$$

However, as described above, the MAC protocols dictate that the gateway compete equally aggressively as the s senders. Thus, the s senders receive $$\frac{1}{s+1}$$

th of the channel (assuming that $s \geq 1$ and $r \geq 1$), whereas the r host receivers each receive only $$\frac{1}{r(s+1)}$$

th of the channel. The ratio between a sender's share of the channel and the fair share is $$\frac{s+r}{s+1}.$$

Therefore, for a constant number of users in a network (i.e., a constant s+r), the ratio is worse for a lower number of senders.

Another scenario in which an unfairness problem arises is in a wireless LAN in which certain nodes may be out of range of each other. This scenario is illustrated in FIG. 2 in which host A 202 is within transmission range of the wireless gateway 204 (e.g., base station) and host node B 206 is also within transmission range of the gateway 204. However, host A 202 and host B 206 are out of transmission range of each other (as indicated by the dotted lines in the figure). There are two data flows, data flow 1 from host A 202 to gateway 204 and data flow 2 from gateway 204 to host B 206. We assume that both flows are backlogged in that they always have data available to send over the shared communication channel. In accordance with the wireless MAC protocol, only one flow may send a data packet at a time via the air interface. Ideally, it would be expected that data flow 1 and data flow 2 would equally share then communication channel. However, unfairness in this scenario occurs as a result of the fact that hosts cannot distinguish between packets in error and packets that are received with a very low power. Here, host A 202 is far enough from host B 206 such that the two hosts cannot effectively communicate with each other, but they are close enough such that the transmission from one node will be received (albeit with very low power) at the other node. Thus, for example, clear to send (CTS) and acknowledgment (ACK) messages sent from host B 206 to gateway 204 will be received with very low power at host A 202. Since host A 202 will be unable to determine the contents of these transmissions, host A 202 will handle receipt of these transmissions as if an error occurred. Such an error condition requires, in accordance with the MAC protocol, host A 202 to defer any transmission for an extended inter-frame spacing (EIFS) period. Thus, host A 202 will defer after the successful transmission of a flow 2 data packet. This results in host A contending less aggressively for the shared communication channel, resulting in reduced throughput for flow 1 and an unfair sharing of the communication channel.

While there have been proposals to solve the unfairness problems in shared access networks, these solutions have generally required changes to the MAC protocol layer. These solution are less desirable because they require changes to well established communication standards and as such, the communications industry is reluctant to adopt such solutions.

SUMMARY OF THE INVENTION

The present invention provides a method and apparatus for fair sharing of a shared communication channel without requiring a change to the highly standardized media access control layer of network nodes.

In accordance with the invention, a data rate is either computed or received by a network node, and the data rate is enforced at a network protocol stack layer above the media access control layer. In one advantageous embodiment of the invention, the data rate is enforced at the link layer of the network protocol stack.

The data rate may be computed by the network node, in which case the network node requires access to information necessary to compute the data rate. This required information may be obtained by the network node snooping the data traffic on the network, by transmission from other network nodes, or by a combination of snooping and transmission from other network nodes. Alternatively, the data rate may be computed elsewhere in the network and received by the network node as a data transmission. In this latter case, the network node enforces the data rate as received via the network.

In accordance with one embodiment of the invention, the data rate is enforced at the link layer of the network node by controlling the flow of data packets from the link layer to the media access control layer.

These and other advantages of the invention will be apparent to those of ordinary skill in the art by reference to the following detailed description and the accompanying drawings.

BRIEF DESCRIPTION OF THE DRAWINGS

FIG. 5 shows pseudocode for computing a fair share data rate.

DETAILED DESCRIPTION

Figure 1:
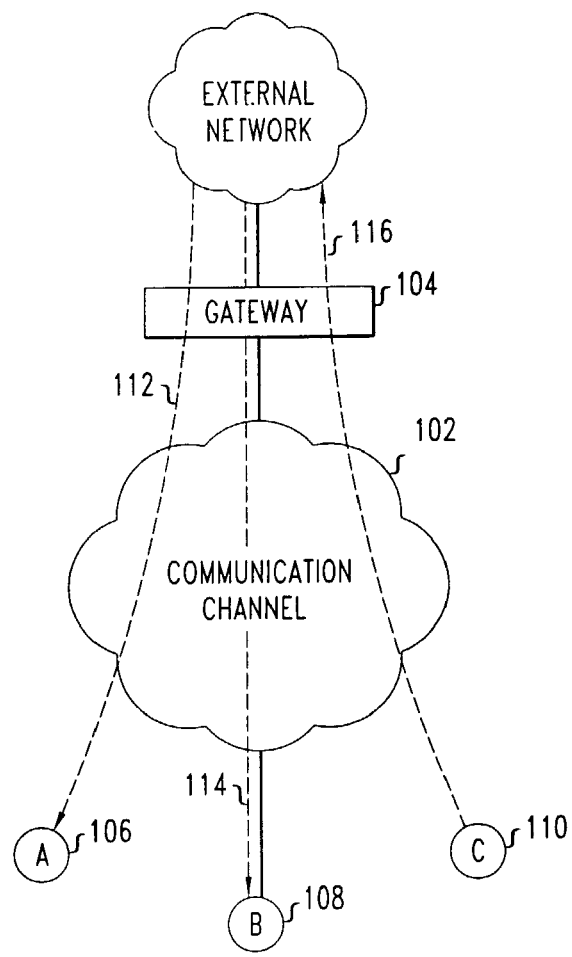
FIG. 1 shows a shared communication channel network.
Figure 3:
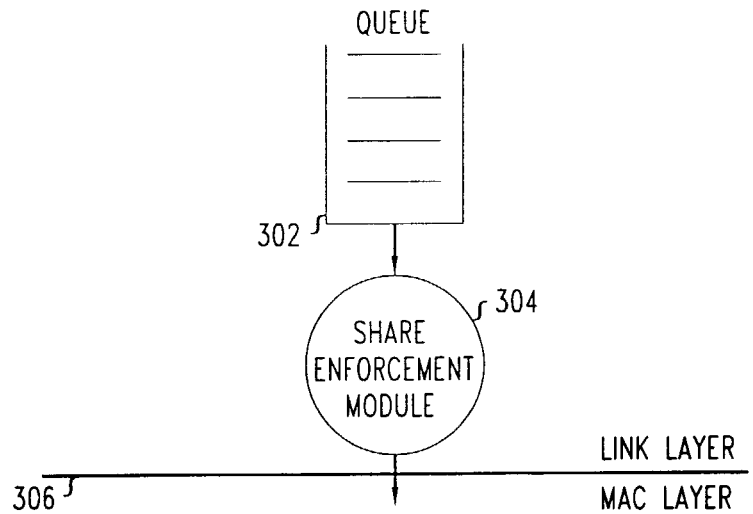
FIG. 3 shows a functional block diagram of portions of a host node.

As described above in the Background section, there are generally two types of network nodes, host nodes and gateway nodes. FIG. 1 shows host nodes 106, 108, 110, and gateway node 104. FIG. 3 show a functional block diagram of the portions of a host node 300 relevant for an understanding of one embodiment of the present invention. As would be well understood by one of ordinary skill in the art, the elements shown in FIG. 3 represent functions of the host node 300. For example, line 306 is shown as a border between the link layer and the MAC layer, both of which are software layers in the network protocol stack. Functions shown above the line 306 are implemented in the link layer, while functions shown below line 306 are functions implemented in the MAC layer. The actual functions may be implemented in software, hardware, or a combination of software and hardware. For example, the functions described herein may be implemented using a computer processor and stored computer program instructions. One skilled in the art could readily implement a network node in accordance with the invention given the description herein.

Figure 2:
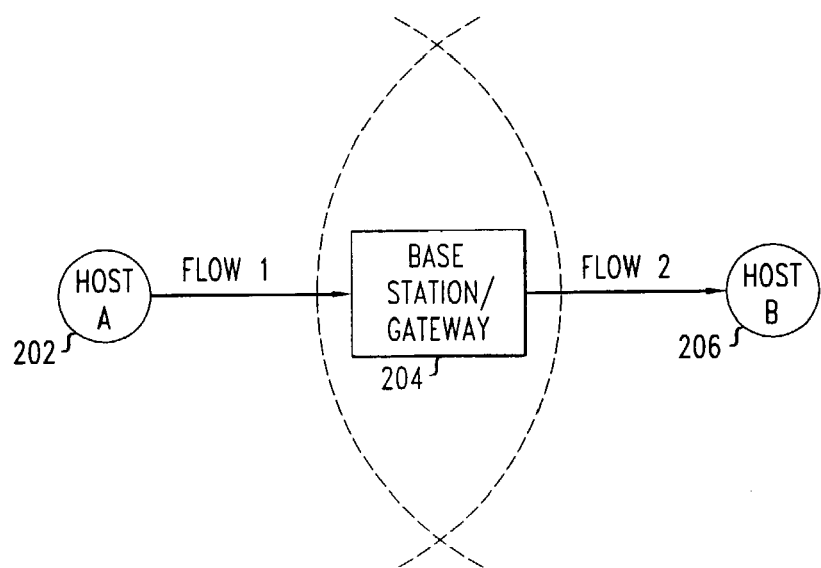
FIG. 2 shows a wireless local area network.

Returning now to FIG. 3, the host node 300 contains a queue 302 which stores the data packets waiting to be transmitted from the host node. For purposes of the present description, it will be assumed that a host node has one data flow from the host node to a gateway node. The data packets associated with this data flow and waiting to be transmitted are stored in queue 302. In accordance with one aspect of the invention, a share enforcement module 304 in the link layer of the network protocol stack controls the flow of data packets from queue 302 to the MAC layer. It is this share enforcement module which controls the flow of data packets from the network node 300 to the shared communication channel and thus enforces a fair share of network access for the node. As seen in FIG. 2, the share enforcement module is implemented in the link layer of the network protocol stack, and as such, implementation of the present invention in existing network nodes would not require a change to the highly standardized MAC layer. This aspect of the invention (i.e., enforcing the data rate at a network protocol layer above the MAC layer) makes the present solution an attractive solution to the fair sharing problem described above in the Background. The share enforcement module may be implemented in hardware, software, or a combination of hardware and software. One of ordinary skill in the art could readily implement the functionality of a share enforcement module given the description herein.

Figure 4:
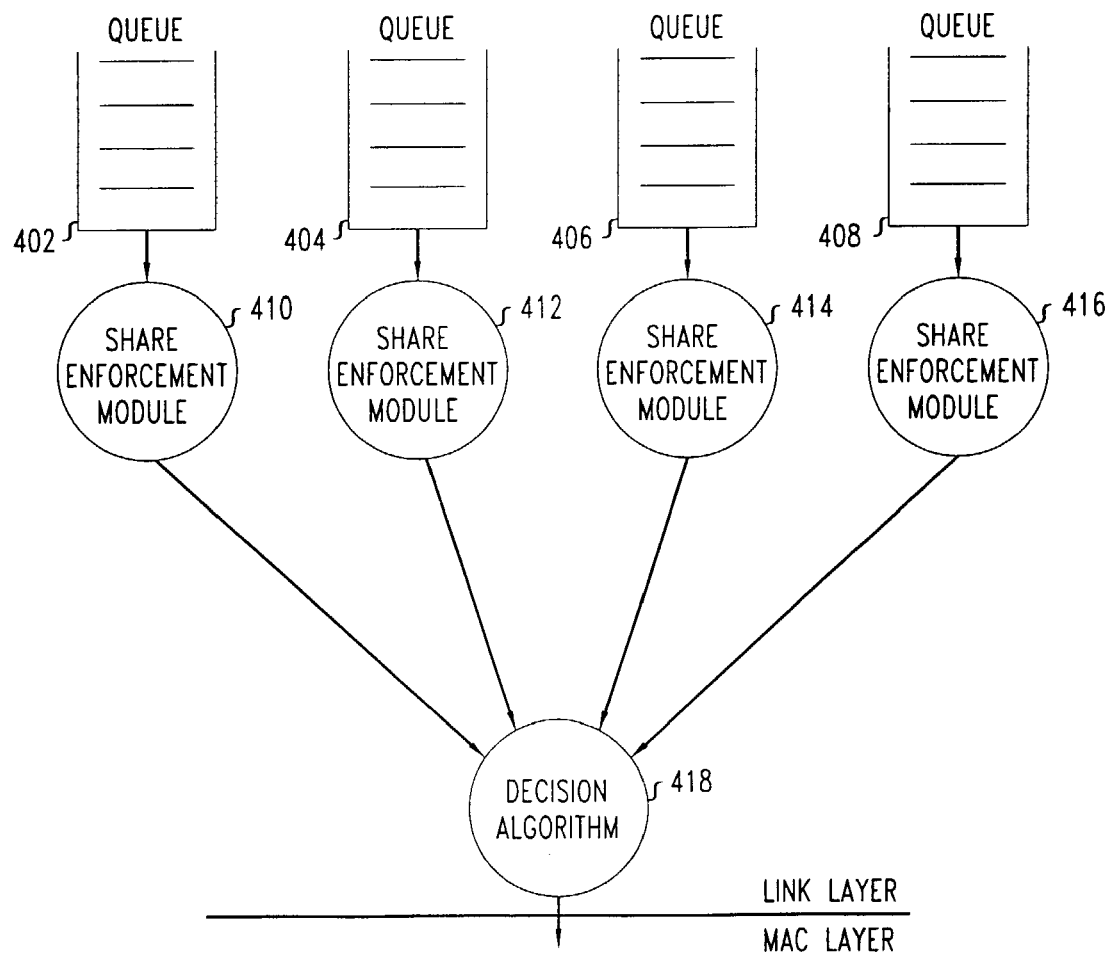
FIG. 4 shows a functional block diagram of portions of a gateway node.

FIG. 4 shows an embodiment of the invention in which the aspects of the invention are implemented in a gateway node 400. In this embodiment, the gateway node 400 contains multiple queues 402, 404, 406, 408 which store the data packets waiting to be transmitted to multiple host nodes on the LAN. Each queue stores the data packets associated with a single data flow. In this embodiment, there are multiple share enforcement modules 410, 412, 414, 416, associated with each queue 402, 404, 406, 408 respectively. As described above, each share enforcement module is in the link layer of the network protocol stack and controls the flow of data packets from its associated queue to the MAC layer and enforces a fair share of network access for the node. FIG. 4 also shows a decision algorithm 418 as a function which receives data packets from the various queues/share enforcement modules and coordinates the passing of these data packets to the MAC layer. The decision algorithm 418 implements a scheduling scheme with respect to the data packets received from the share enforcement modules. Such scheduling scheme may be, for example, a round robin scheduling scheme.

The share enforcement modules described above are used to enforce a fair share of network resources for data flows. The computation of the fair share data rate will now be described in conjunction with the pseudocode shown in FIG. 5. In an advantageous embodiment, the computation of the fair share in accordance with the pseudocode shown in FIG. 5 is performed by the gateway node of the LAN. As will become clear from the description below, it is advantageous to computer the fair share at the gateway node because the gateway node has more complete information required for the computation. Returning to FIG. 5, as indicated in line 1 of the pseudocode, the algorithm for computing the fair share requires the input of the following values: B, $b_i$, $s_i$, and n, where B is the channel capacity of the shared communication channel, $b_i$ is the data rate of the $i^{th}$ host node, and $s_i$ is an indication as to whether the $i^{th}$ host node is satisfied with its current data rate, and n is the number of active flows in the network.

The channel capacity B in an Ethernet LAN is a fixed and known capacity. (e.g., 10 or 100 megabits per second). In a wireless LAN, the channel capacity B may be estimated as follows. If some of the flows of the network are backlogged, then it is likely that the channel is fully utilized. In this case, the total number of packets sent during a particular time period is a good approximation of the channel capacity during that time period. The gateway node knows if its flows are backlogged or not and can estimate the channel capacity B as described above. In the less likely scenario of the gateway not being backlogged and the hosts being backlogged, the gateway will not be able to determine that the channel is fully utilized. In particular wireless network implementations, the host nodes may also have access to the above information necessary to estimate the channel capacity B as described above. The capacity may also be calculated based on the time a data packet spends in the MAC layer after being passed to the MAC layer by a share enforcement module when the node is backlogged. The time taken by the MAC layer in successfully transmitting a packet reflects the amount of observed channel contention and available bandwidth. If packets are being transmitted on average every t seconds, then the channel capacity can be estimated by dividing the average packet size by t.

In order to compute the fair share data rate, the gateway node needs to know whether each of the host nodes in the LAN is satisfied with its current data rate. In one embodiment of the invention, each host node transmits this information to the gateway node using one bit in the IP header of its data packets. The gateway node stores this information for each of the host nodes on the LAN. The host nodes can make the decision as to whether they are satisfied with their current data rate based on their queue lengths. If a host node's queue length is greater than a certain threshold, then the host is considered un-satisfied with its data rate. Alternatively, if the host node's queue length is less than or equal to the threshold, then the host is considered satisfied with its data rate. As described, the host transmits this information ($s_i$) to the gateway node using one bit of the IP header. Of course, one skilled in the art would readily recognize that there are various ways of determining whether a node is satisfied with its current data rate, as well as various ways of transmitting this information to the gateway node.

We assume herein that the gateway node knows the value of n, the number of flows in the LAN. This information is readily available at the gateway node since all flows pass through the gateway node.

Returning to FIG. 5, we will now describe the algorithm for determining the fair share for the nodes. In line 2 of the pseudocode, the set S is initialized to contain an indication of all nodes which are currently satisfied with their data rate (i.e., an indication of those nodes for which $s_i=1$). In line 3, the set U is initialized to contain an indication of all nodes which are currently un-satisfied with their data rate (i.e., an indication of those nodes for which $s_i=0$). In line 4, the fair share $b_f$ is calculated by dividing the bandwidth not used by the satisfied nodes evenly among the unsatisfied nodes. In general, the fair share data rate would be applied to all of the unsatisfied nodes in the network. However, it is possible that the data rate of one or more of the satisfied nodes may be greater than the calculated fair share. Since this would result in an unfair sharing of the communication channel, the algorithm continues as follows. In line 5 it is determined whether all satisfied nodes have a current data rate $b_i$ which is less than or equal to the fair share data rate $b_f$. If all satisfied nodes have a current data rate which is less than or equal to the fair share, then the algorithm ends and the computed fair share $b_f$ is used as the final computed fair share. Alternatively, if it is determined in line 5 that not all satisfied nodes have a current data rate which is less than or equal to the fair share data rate, then the algorithm continues with line 8 where the algorithm identifies those nodes currently in the set S (nodes which are currently satisfied with their data rate) which have a current data rate which is greater than the currently computed fair share. In steps 9 and 10 the satisfied node which has the highest current data rate and therefore also has a current data rate greater than the currently computed fair share is transferred from the set S (nodes which are currently satisfied with their data rate) to the set U (nodes which are currently un-satisfied with their data rate). The algorithm then iteratively continues until all satisfied nodes result with a data rate less than or equal to the fair share data rate $b_f$.

Upon termination of the algorithm, the nodes in the network which are currently in the set U (un-satisfied with their data rate) should be set to operate at the newly computed the fair share rate $b_f$. The gateway node, which computed $b_f$, transmits the fair share data rate to all nodes in the network. The nodes which had determined themselves to be unsatisfied with their current data rate will reset their data rate to the fair share data rate received from the gateway node. In addition, any nodes which were satisfied with a data rate which is greater than the fair share data rate received from the gateway node will reset their data rate to the newly received fair share data rate.

As described above, the fair share data rates are enforced by the share enforcement modules in the network nodes. Thus, for host nodes which have outgoing data flows, the fair share data rate will be enforced in their share enforcement modules (e.g., share enforcement module 304 in FIG. 3). For a gateway node which may have multiple outgoing flows, the fair share data rate is enforced at each of its share enforcement modules associated with its outgoing flows (e.g., share enforcement modules 410, 412, 414, 416 in FIG. 4). It is noted that the data rate enforced by each share enforcement module in a gateway node may be different depending on the data rate assigned to each respective data flow. For example, the data flow associated with queue 402 and share enforcement module 410 may be assigned the fair share data rate $b_f$, while the data flow associated with queue 404 and share enforcement module 412 may be satisfied with, and assigned, some rate less than the fair share data rate $b_f$.

In the embodiment described above, the gateway node computes the fair share data rate and transmits it to the host nodes. In an alternate embodiment, the host nodes could periodically compute the fair share data rate using the algorithm described above. In this embodiment, the host nodes need the required input parameters described above, namely the values for: B, $b_i$, $s_i$, and n. There are various ways for the host nodes to obtain these values. In one embodiment, the host nodes snoop all data packets on the network and determine the required input parameters in the same manner as determined by the gateway node in the embodiment described above. It is noted that this manner of determining the input parameters requires the assumption that the host nodes have access to all data traffic on the network. In a wired LAN, this assumption is reasonable. However, in a wireless LAN, it is possible that the host nodes may not have access to all network traffic. For example, a host node may be within communication range of the gateway node, but not within communication range of all of the other host nodes. In this case, it is possible to have the gateway node periodically transmit the required parameters to the host nodes so that the host nodes can then compute the fair share. Further, in the embodiment in which the host nodes compute the fair share data rate, it is also possible to have the gateway also compute the fair share data rate and periodically transmit it to the host nodes such that the host nodes, which may have incomplete information regarding the input parameters, can validate their own computations.

One skilled in the art would recognize that there are various alternatives with respect to which node or nodes in which the fair share computation is performed, as well as various alternatives with respect to how the input parameters are computed or transmitted to the nodes which perform the computation, as well as how the computed fair share is transmitted to the various nodes. These various alternatives and combinations would be well known to one of ordinary skill in the art and will not be described in detail herein.

While the above description described various embodiments in which all unsatisfied nodes are assigned the same fair share data rate, it is also possible to assign different data rates based on the principles of the present invention. For example different classes of nodes could be provided with different quality of service by using a weighting scheme such that the fair share data rate is weighted differently for the different classes of users. Alternatively, multiple fair share data rates could be computed for different classes of nodes. One skilled in the art would recognize that there are various alternatives to providing different quality of services in accordance with the principles of the invention as described above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for controlling access to a shared communication channel by a plurality of network nodes, each network node having a network protocol stack comprising software layers including a media access control layer, said method comprising the steps of:

defining a sub-layer above said media access control layer;

providing a fair share protocol for said sub-layer, to facilitate communication between respective sub-layers of said network nodes;

using data traffic information to determine a fair share data rate over said channel; and enforcing said fair share data rate at said sub-layers to control flow of data packets to said media access control layers.

2. The method of claim 1 wherein said fair share protocol is implemented in a link layer included with in said software layer.

3. The method of claim 1 further comprising the step of:
snooping said communication channel to determine said data traffic information.

4. The method of claim 3, wherein calculating fair share data rate further comprises the steps of:

determining the channel capacity of said communication channel;

identifying all nodes which are satisfied with said fair share data rate;

determining an amount of not used capacity;

identifying all nodes which are unsatisfied with said fair share data rate;

dividing said data rate not used by said satisfied nodes evenly among said unsatisfied nodes;

determining whether said satisfied nodes have a current data rate less than or equal to said fair share data rate; and reiterating said calculation until all said satisfied nodes have said current data rate less than or equal to said fair share data rate.

5. The method of claim 1 further comprising the step of:
transmitting said data rate to at least one network node.

6. The method of claim 1 wherein packets entering said media access control layer are controlled at each said plurality of nodes connected to said channel.

7. The method of claim 1 wherein said fair share data rate is received from a second said network node.

8. A first network node connected to a communications channel having a plurality of network nodes each network node having a network protocol stack comprising software layers including a media access control layer said node comprising:
- a sub-layer above said media access control layer;
- a fair share protocol for said sub-layer, to facilitate communication between respective sub-layers of said network nodes;
- means for using data traffic information to determine a fair share data rate over said channel; and
- an enforcement means for enforcing said fair share data rate at said sub-layer, to control flow of data packets to said media access control layer.

9. The network node of claim 8 wherein said fair share protocol is implemented in a link layer included within said software layer.

10. The network node of claim 9 wherein said enforcement means comprises means for controlling the flow of data packets from said link layer to said media access control layer.

11. The network node of claim 8, wherein said fair share data rate is received from a second said network node.

12. The network node of claim 8 further comprising;
- a means for snooping said communication channel, to determine data traffic information.

13. A computer readable medium comprising computer executable program instructions for enabling a processor to perform steps which includes, a method for controlling access to a shared communication channel by a plurality of network nodes, each network node having a network protocol stack comprising software layers including a media access control layer, said method comprising the steps of:
- defining a sub-layer above said media access control layer;
- providing a fair share protocol for said sub-layer, to facilitate communication between respective sub-layers of said network nodes;
- using data traffic information to determine a fair share data rate over said channel; and
- enforcing said fair share data rate at said sub-layers to control flow of data packets to said media access control layers.

14. The medium of claim 13 wherein said fair share protocol is implemented in a link layer included with in said software layer.

15. The medium of claim 13 wherein said method further comprises the step of:
- snooping said communication channel to determine data traffic information.

16. The medium of claim 13 wherein packets entering said media access control layer are controlled at each said plurality of nodes connected to said channel.

17. The medium of claim 13 wherein said fair share data rate is received from a second said network node.

* * * * *